United States Patent [19]
Berry et al.

[11] Patent Number: 6,064,389
[45] Date of Patent: *May 16, 2000

[54] DISTANCE DEPENDENT SELECTIVE ACTIVATION OF THREE-DIMENSIONAL OBJECTS IN THREE-DIMENSIONAL WORKSPACE INTERACTIVE DISPLAYS

[75] Inventors: Richard Edmond Berry; Scott Harlan Isensee, both of Georgetown, Tex.; David John Roberts, Stockton, United Kingdom

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,685

[22] Filed: May 27, 1997

[51] Int. Cl.⁷ .................................................. G06T 15/00
[52] U.S. Cl. ......................... 345/419; 345/433; 345/355; 345/357
[58] Field of Search ..................... 345/419, 355, 345/357, 433, 474

[56] References Cited

U.S. PATENT DOCUMENTS

| | | | |
|---|---|---|---|
| 4,847,693 | 7/1989 | Eppolito | 358/225 |
| 4,947,347 | 8/1990 | Sato | 364/522 |
| 5,276,785 | 1/1994 | Mackinlay et al. | 345/427 |
| 5,310,349 | 5/1994 | Daniels et al. | 434/350 |
| 5,414,801 | 5/1995 | Smith et al. | 345/419 |
| 5,465,362 | 11/1995 | Orton et al. | 395/700 |
| 5,469,295 | 11/1995 | Burke | 359/478 |
| 5,479,185 | 12/1995 | Biverot | 345/6 |
| 5,495,576 | 2/1996 | Ritchey | 395/125 |
| 5,513,303 | 4/1996 | Robertson et al. | 345/419 |
| 5,530,235 | 6/1996 | Stefik et al. | 235/492 |
| 5,555,354 | 9/1996 | Strasnick et al. | 345/427 |
| 5,608,850 | 3/1997 | Robertson | 345/427 |
| 5,671,381 | 9/1997 | Strasnick et al. | 345/355 |
| 5,689,628 | 11/1997 | Robertson | 345/427 |
| 5,689,669 | 11/1997 | Lynch et al. | 345/355 |
| 5,754,189 | 5/1998 | Doi et al. | 345/473 |
| 5,757,290 | 5/1998 | Watanabe et al. | 340/995 |
| 5,767,855 | 6/1998 | Bardon et al. | 345/355 |
| 5,808,613 | 9/1998 | Marrin et al. | 345/355 |
| 5,847,709 | 12/1998 | Card et al. | 345/355 |
| 5,848,399 | 12/1998 | Burke | 705/27 |
| 5,864,333 | 1/1999 | O'Heir | 345/157 |
| 5,874,956 | 2/1999 | LaHood | 345/339 |
| 5,883,628 | 3/1999 | Mullaly et al. | 345/355 |
| 5,900,879 | 5/1999 | Berry et al. | 345/419 |
| 5,903,271 | 5/1999 | Bardon et al. | 345/419 |
| 5,923,324 | 7/1999 | Berry et al. | 345/334 |
| 5,969,724 | 10/1999 | Berry et al. | 345/429 |
| 5,973,697 | 10/1999 | Berry et al. | 345/418 |
| 5,982,372 | 11/1999 | Brush, II et al. | 345/418 |

*Primary Examiner*—Mark K. Zimmerman
*Assistant Examiner*—Albert K. Lee
*Attorney, Agent, or Firm*—J. B. Kraft; Vodel Emile

[57] ABSTRACT

A system, method and computer program are provided for a virtual three-dimensional workspace wherein dependent upon the position of the viewpoint with respect to a particular object, that object may be a functional interactive object with the user at the viewpoint if the virtual distance of the viewpoint to the object is within a certain specified distance. However, if the viewpoint moves beyond this distance, then the object is rendered noninteractive and becomes part of an aggregate object at the next distance level. In forming this aggregate object, the selected object joins a plurality of other noninteractive objects.

15 Claims, 7 Drawing Sheets

LEVEL 3

FIG. 7A

DISTANCE DEPENDENT SELECTIVE ACTIVATION OF THREE-DIMENSIONAL OBJECTS IN THREE-DIMENSIONAL WORKSPACE INTERACTIVE DISPLAYS

CROSS-REFERENCE TO RELATED PATENT APPLICATIONS

Copending application, "BACK AWAY NAVIGATION FROM THREE-DIMENSIONAL OBJECTS IN THREE-DIMENSIONAL WORKSPACE INTERACTIVE DISPLAYS", Richard E. Berry et al. (Attorney Docket No. AT9-97-028), relates to a navigation system which tracks a progression of viewpoints of narrowing scope as the user approaches an object to be interacted with and then steps the viewer through viewpoints of progressively broadening scope as the viewer backs away from the object.

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/813,891 (Attorney Docket No. AT9-96-310), entitled "VIEWER INTERACTIVE OBJECT IN VIRTUAL THREE-DIMENSIONAL WORKSPACE", filed Mar. 7, 1997, and Ser. No. 08/813,848 (Attorney Docket No. AT9-96-311), entitled "VIEWER INTERACTIVE OBJECT WITH MULTIPLE SELECTABLE FACE VIEWS IN VIRTUAL THREE-DIMENSIONAL WORKSPACE", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations. The invention facilitates the user's navigation in the 3D space so that the user may easily keep track of his planned routes through this three-dimensional workspace, particularly when the user is narrowing in on a particular object for functional interaction. In the three-dimensional workspace, there are virtually hundreds of objects with which the viewer may potentially interact. Since the workspace resembles the real world, a user cannot interact with every object at every level of navigation. Many of the objects are just too "far away" in virtual distances for the viewer to practically interact with the object. The present invention is directed to a system for helping the user to narrow in on the object he wishes to interact with through a hierarchy of navigation levels through which the interactivity of objects is continually changing.

SUMMARY OF THE INVENTION

A key aspect of the present invention involves providing the user with a hierarchy of viewpoints and determining at each viewpoint level, which objects the user may functionally interact with. Thus, in a data processor controlled display system involving a three-dimensional display workspace having virtual user interactive objects in the workspace, viewer interactive navigation means are provided so that the viewer may navigate through a plurality of viewpoints into the three-dimensional workspace. In its broadest aspects, the present invention involves providing to a user an initial viewpoint at a first virtual distance from a selected object which is such a distance that a user can functionally interact with the selected object. Then means are provided for moving away from the selected object to a second viewpoint which is at a second virtual distance from the selected object at which second distance the user can no longer interact with the selected object. However, once the viewpoint reaches or exceeds this second virtual distance from the object, the object itself in combination with other inactive objects becomes part of an aggregate object which the viewer may interact with.

Before proceeding further and elaborating the present invention, it should be understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint.

The present invention also involves the reverse of the process described hereinabove, i.e. it provides means for returning the viewpoint so that the viewpoint is closer than that second virtual distance from the selected object at which point there are means responsive to the return within the second virtual distance for rendering a selective object user interactive again and accordingly rendering said aggregate object noninteractive.

DETAILED DESCRIPTION OF THE PREFERRED EMBODIMENT

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The three-dimensional workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation.

The three-dimensional objects which will be subsequently described in embodiments of the present invention may be implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language.

The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above.

With this background of the various expedients which may be used to implement the present invention, the preferred embodiments will now be described.

Figure 1:
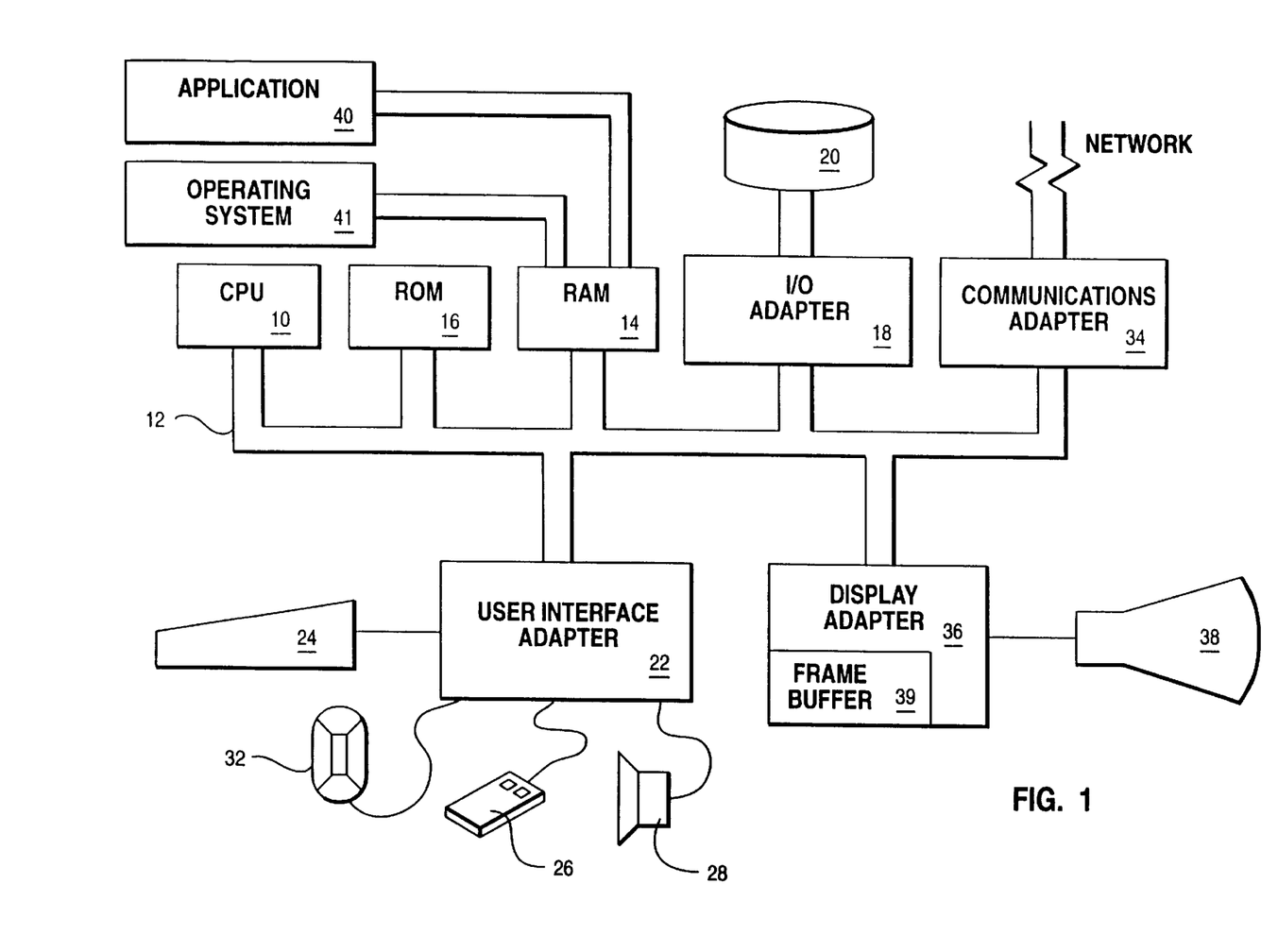
FIG. 1 is a block diagram of a data processing system including a central processing unit which is capable of implementing the present invention.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. An embodiment will be described with respect to a virtual reality three-dimensional workspace of the type shown in FIG. 2. While the simplified examples of the present invention to be subsequently described with respect to the diagrams of FIGS. 3 through 6 and the process flowchart with respect to FIGS. 7A and 7B, do not specifically relate to the illustrative structures shown in the three-dimensional workspace of FIG. 2, the workspace of FIG. 2 will be first described in general to give the reader an understanding of the environment within which the present invention is operable.

Figure 2:
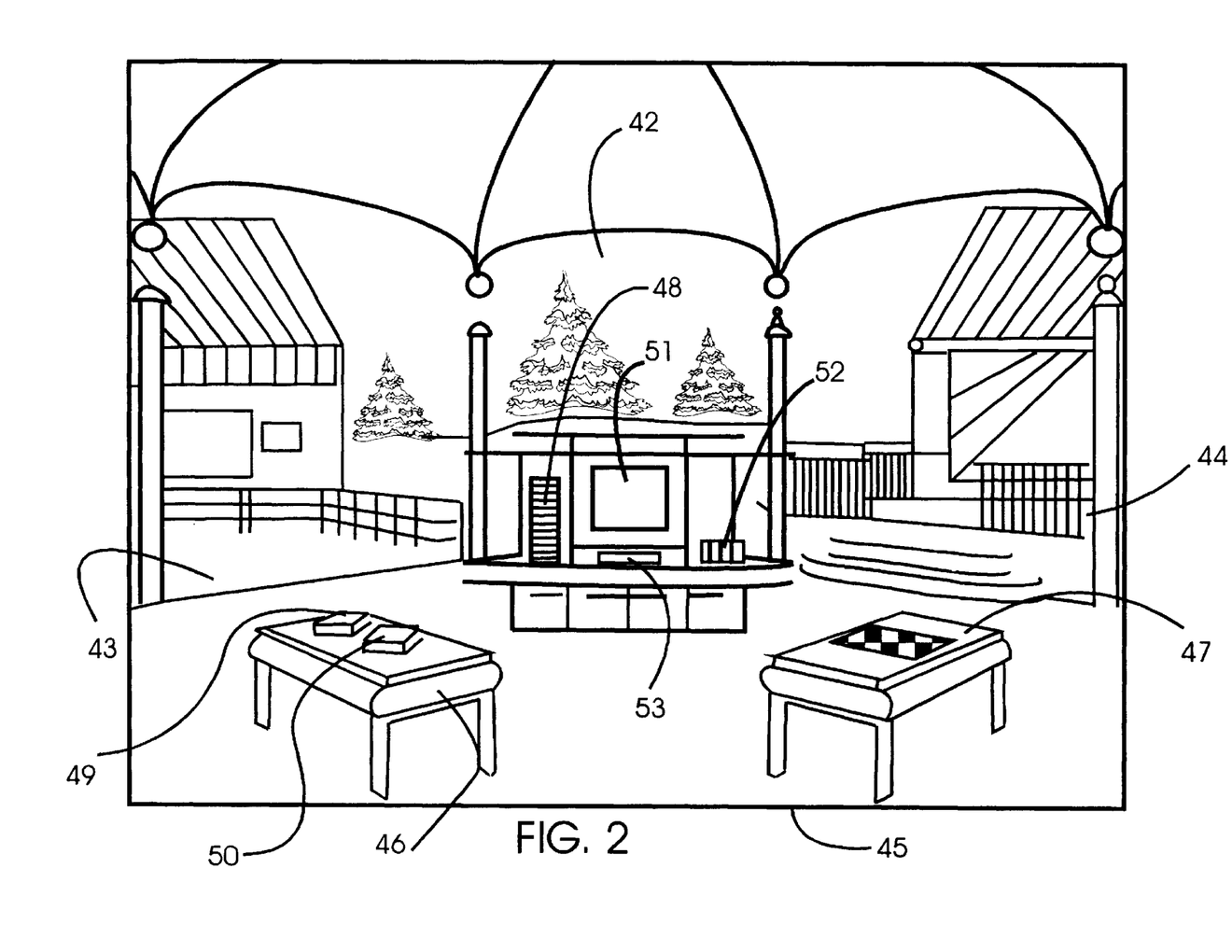
FIG. 2 is a representation of a three-dimensional workspace containing objects which represents a typical environment within which the present invention may be practiced.

The three-dimensional workspace of FIG. 2 may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as the operating system 41 in which the application 40 operates.

The workspace shown in FIG. 2 is a portion of an even greater virtual reality workspace which will be understood to include various indoor and outdoor structures such as offices, living areas, entertaining areas, buildings, roads, etc. With all of these possibilities and possible paths, it may be readily seen how this virtual reality three-dimensional world is potentially quite complex and confusing to the viewer. The present invention is directed to making this world less confusing to the viewer by helping the viewer hone in on objects to which he wishes to functionally relate. The present invention accomplishes this through a hierarchy of areas and regions within the workspace. These areas or regions may be considered as aggregate objects containing a plurality of next lower level aggregate objects which in turn contain aggregate objects of the next lower level and so on until the selected functional object is reached as will hereinafter be described with respect to the diagrams of FIGS. 3 through 6.

In any event let us return to the image in FIG. 2, which for purposes of this illustration will be regarded as a high level viewpoint into a workspace divided into several general regions or areas: outdoor region 42, side room regions 43 and 44, and main or central room region 45. Each of these regions in this viewpoint may be considered as an aggregate object at a high level which is an aggregate of a plurality of next lower level objects contained in each of the regions. For purposes of illustration let us concentrate on main room region 45. It is an aggregate of three objects: left table 46, right table 47 and entertainment center 48. In turn, objects 46, 47 and 48 may be considered at the next lower level as aggregate objects. For example, table 46 is an aggregate object of object books 49 and 50. While entertainment center 48 may be considered as an aggregate object of TV 51, CD rack 52 and VCR 53.

With this general background, we will now proceed to a description of an embodiment shown in FIGS. 3 through 6 which has been simplified to a plan or top view series of diagrams. The areas represented do not correspond to areas in the workspace of FIG. 2, but are a hypothetical workspace which has been simplified to bare outlines in order to more clearly explain the present invention. Let us assume that the initial viewpoint is viewpoint 54. From viewpoint 54, the viewer sees at a high level or level 1, three major areas, 55, 56 and 57, which could be considered as rooms. These rooms are aggregate objects. For example, room 55 is an aggregate object containing objects: table 63, bookcase 64 and file cabinet set 55. Likewise, room 56 is an aggregate object of illustrative objects 58, 59 and 60, while room 57 is an aggregate of objects 61 and 62 in that room.

While this is diagrammatic, let us consider viewpoint 54 as presented to the user on a display interface such as that which could be shown on display monitor 38 of FIG. 1. In accordance with conventional techniques, the user may control the viewpoint through conventional I/O devices such as mouse 26 in FIG. 1, which operates through user interface 22 to call upon the VRT programs in RAM 14 cooperating with the operating system 41 to create the images in frame buffer 39 of display adapter 36 to control the display on monitor 38. Viewpoint 54 may be changed using conventional virtual three-dimensional workspace navigation techniques. The viewpoint interface which is manifested as a three-dimensional virtual reality view into the workspace as shown in FIG. 2 is changeable as the user moves closer or backs away from objects in the workspace or moves to the right or left or up or down in the workspace. All this may be controlled by a suitable conventional I/O device such as mouse 26 of FIG. 1. While the movement in FIGS. 3 through 6, for simplicity of illustration, will be presented in a single plane, it should be understood that the movement may be along any lines in the three orthogonal, X, Y and Z directions.

Figure 3:
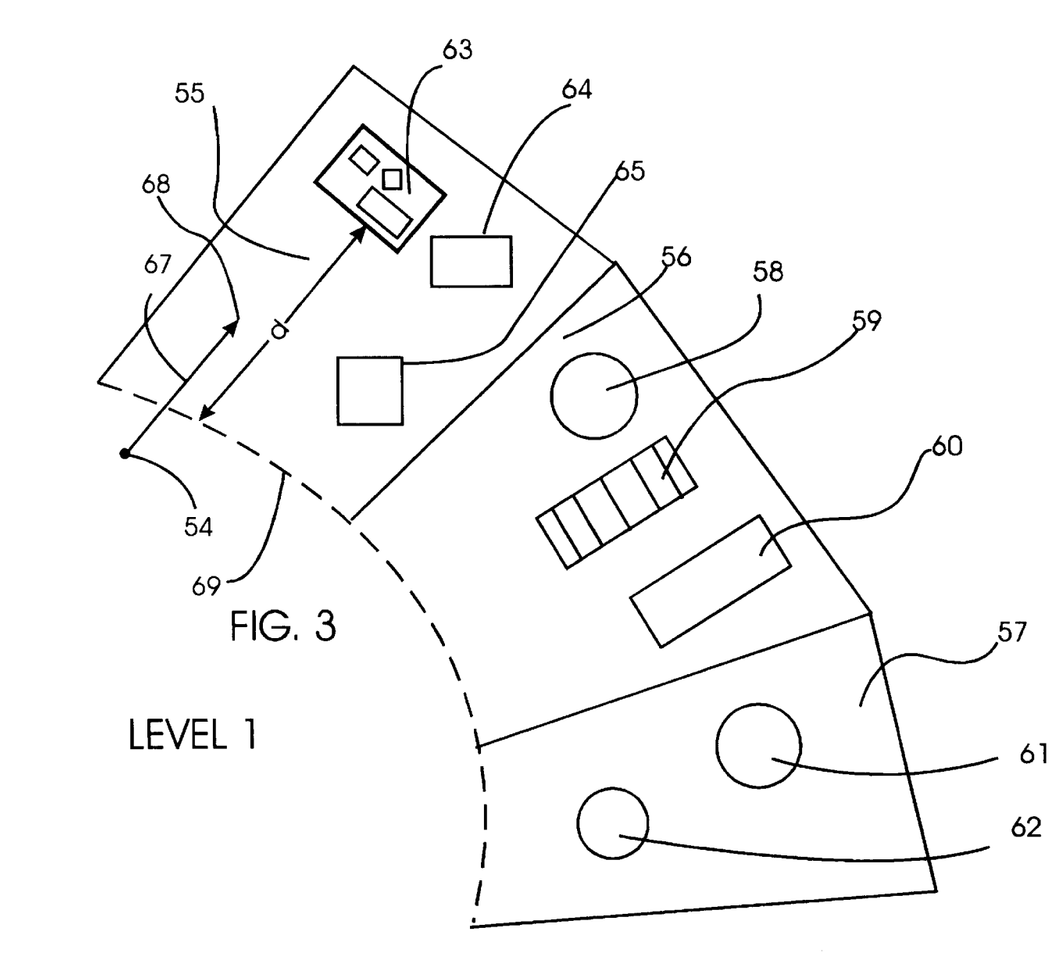
FIGS. 3 through 6 are diagrammatic representations of an overhead or plan view of a three-dimensional workspace illustrating how the present invention operates at various object and object aggregate levels.
Figure 4:
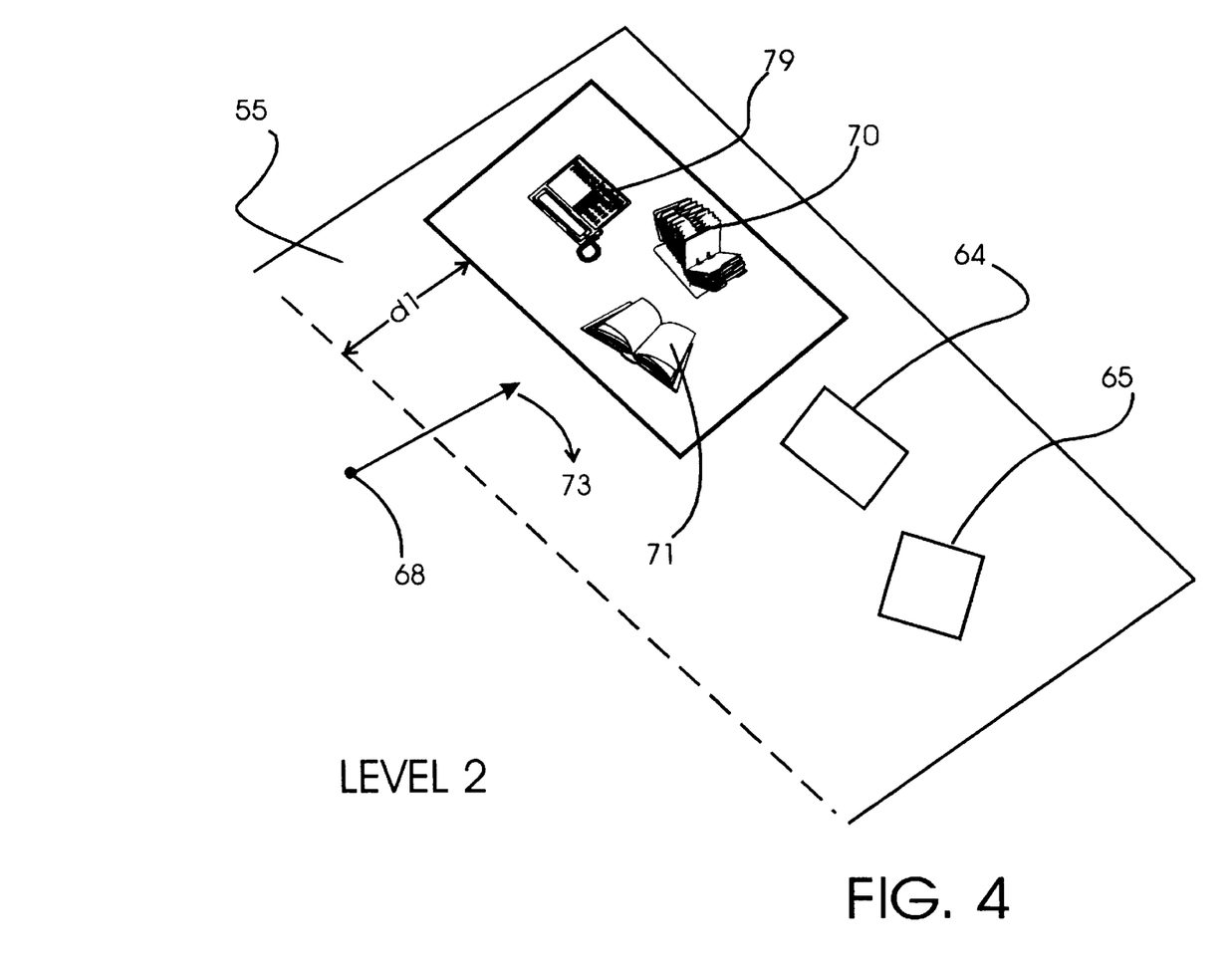
Figure 5:
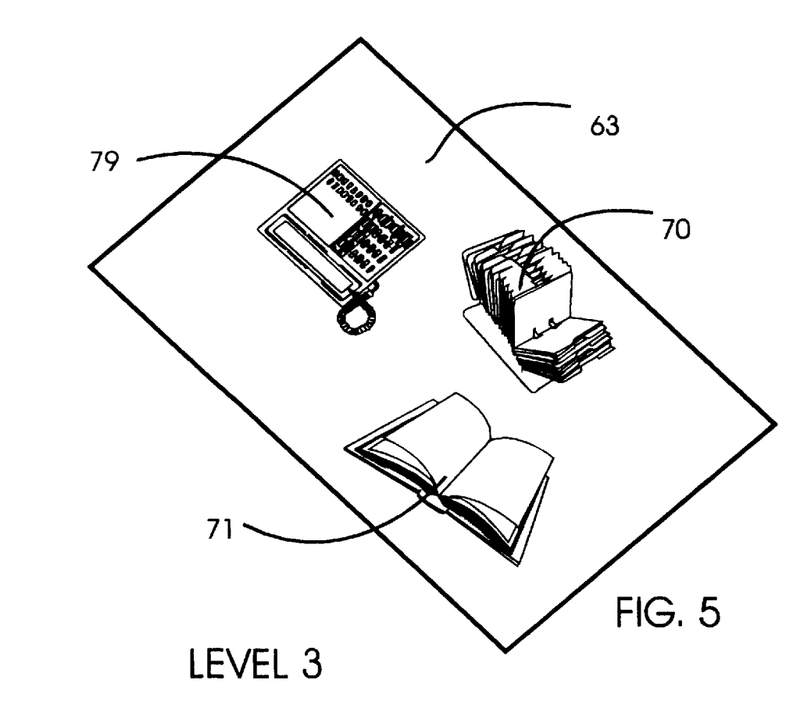
Figure 6:
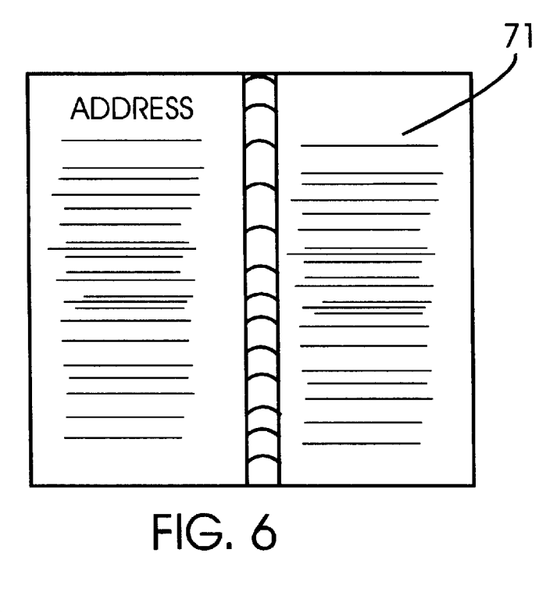

The invention will now be described in an embodiment relative to room 55 of FIG. 3. It should be understood that as long as viewpoint 54 remains at the position shown in FIG. 3, the viewer or user will be unable to functionally interact with any of objects 58 through 65. If there is to be any interaction, it can only be at the level of aggregate objects 55, 56 and 57. However, let us assume that the user with conventional navigation techniques moves the viewpoint along path 67 until he enters room 55 at point 68. In doing so, he crosses line 69 which is the minimum distance ("d") from objects 63, 64 and 65 at which room 55 can function as an aggregate object. Once line 69 is crossed, then the viewpoint is established, let us say, at point 68. Then, as shown in FIG. 4, objects 63, 64 and 65 now considered aggregate objects at level 2, being respectively aggregate objects of the objects included therein, i.e. table 63 is an aggregate of telephone 69, card file 70 and address book 71, while bookcase 64 is an aggregate of the books contained therein and file cabinet set 65 is an aggregate the file drawers in the cabinet. Thus, since objects 69, 70 and 71 on aggregate object table 63 are part of an aggregate, they still cannot be functionally interacted with from viewpoint 68. However, as shown in FIG. 4, when viewpoint 68 is navigated to viewpoint 73, the viewpoint is within the minimum distance d1 from table 63 necessary for table 63 to stop functioning as an aggregate object and objects 69 through 71 on table 63 are rendered functionally interactive and the system is at level 3 as shown in FIG. 5. At viewpoint 73 in FIG. 5, the user may functionally interact with either telephone object 69, card file object 70 or address book object 71. The viewer selects address book 71 and proceeds to interact with the address book by turning pages and finding an address as shown in FIG. 6.

Figure 7A:
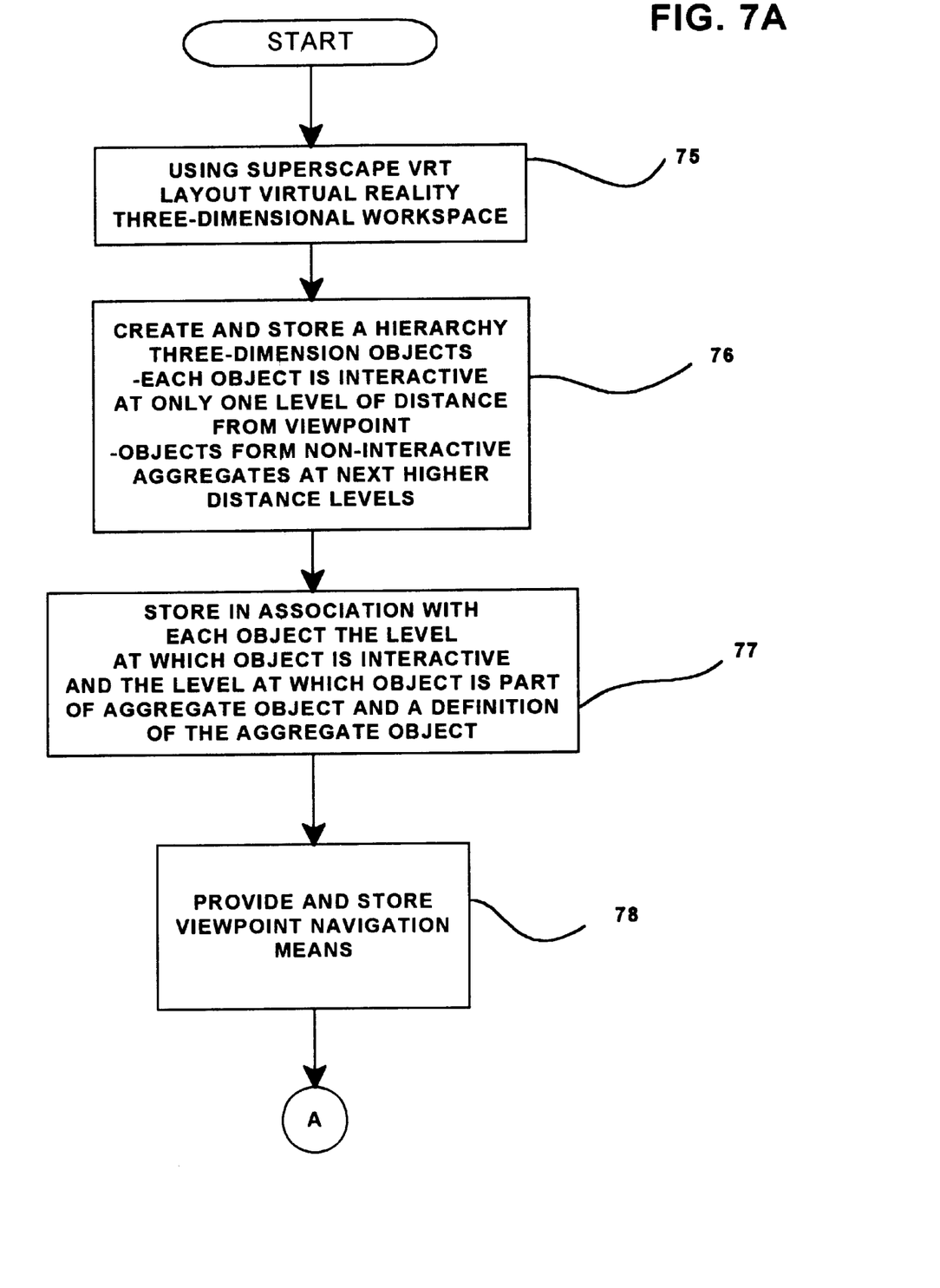
FIGS. 7A and 7B are flowcharts of a process implemented by the present invention for carrying an embodiment of the present invention.
Figure 7B:
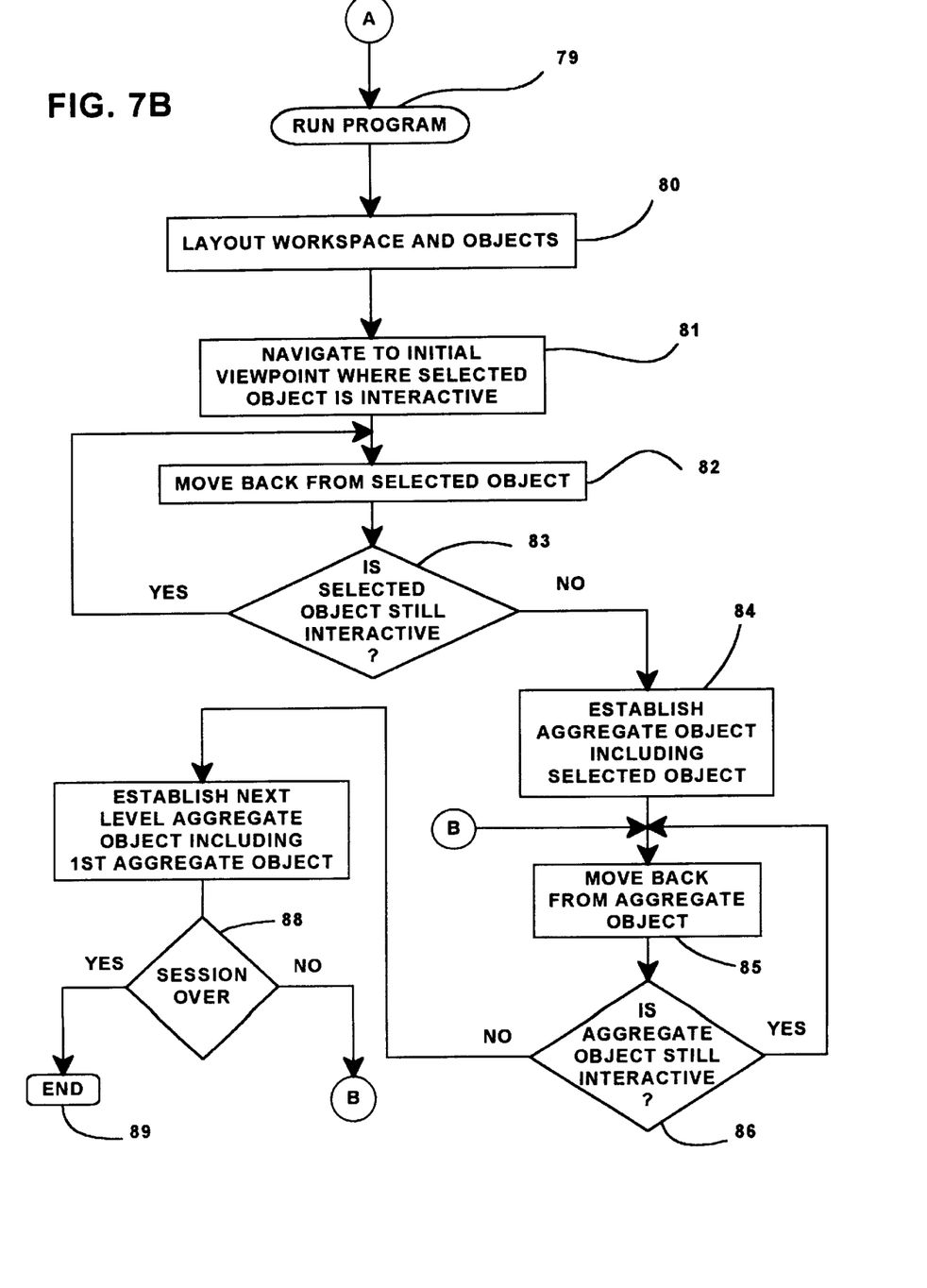

With reference to FIGS. 7A and 7B, we will now describe the process involved in the present invention. FIG. 7A describes the steps relating to the creation of a virtual reality three-dimensional landscape, the creation of a hierarchy of three-dimensional objects within that landscape and the organization of the objects in that landscape into a hierarchy of aggregate objects. FIG. 7B describes how a particular navigation process with respect to functional objects is run using the programs of FIG. 7A.

Thus, in FIG. 7A, first, step 75, the desired virtual reality three-dimensional workspace, such as the workspace shown in FIG. 2, is created. Then, step 76, there is created and stored a hierarchy of three-dimensional objects. Each object is interactive at a particular level of distance from the viewpoint and when objects are noninteractive because of distances from the viewpoint, they are organized to form into aggregate objects which are interactive at the particular distance. Also, step 77, there is accordingly stored in association with each object, an indication of the distance level at which the object is interactive, as well as the distance level at which the object is part of an aggregate object. Finally, step 78, conventional viewpoint navigation means is provided and stored. The process now proceeds to FIG. 7B where the created virtual reality programs are run, step 79.

As previously mentioned, a program will be described in terms of the simplified diagrams in FIGS. 3 through 6. These will be assumed to take place in a virtual three-dimensional workspace such as that shown in FIG. 2. The program initially sets up the workspace and object layout, step 80. Now in order to elaborate and perhaps better explain the flow of the present invention, we will assume that the viewer has navigated to a viewpoint where he is interactive with the selected object, step 81, FIG. 7B. Let us assume that this is viewpoint 73 in FIG. 5 and the viewer is interacting with book 71 on desk 63. Then the user or viewer moves back from his selected object, step 82. Next, decision block 83 determines if the selected object is still interactive. Now, if in moving back from initial viewpoint 73 in FIG. 5 the viewer moves back to viewpoint 68 in FIG. 4, then, distance d1 will be exceeded and the objects on desk 63 including interactive book 70 will be rendered inactive a and the decision from decision block 83 will be no. Accordingly, step 84, an aggregate object will be established including the selected object, i.e. aggregate object desk 63 including book object 71. Next, step 85, the viewpoint is moved back from aggregate object desk 63, e.g. to viewpoint 54 in FIG. 3, thus exceeding the distance d in FIG. 3 which renders desk 63 noninteractive. Thus, the decision from decision block 86 will be no and, step 87, the next level aggregate object is established, i.e. room 55 which includes desk 63. At this point, a decision is routinely made as to whether the session is over, step 88. If it is, the session is ended, step 89. If it is not, then the system loops back to step 85 via point B. Likewise, if the decision from decision block 86 is yes, the system loops back to point B and step 85, the backup procedure, continues as previously described.

Although certain preferred embodiments have been shown and described, it will be understood that many changes and modifications may be made therein without departing from the scope and intent of the appended claims.

What is claimed is:

1. In a data processor controlled display system for displaying a virtual three-dimensional display workspace having virtual user interactive objects within said workspace:

means for navigating to a first viewpoint at which at least one of said objects is interactively distinct, means for navigating to a second viewpoint at which said at least one object becomes interactively indistinct, and means for forming at said second viewpoint an interactively distinct aggregate object comprising said interactively indistinct object and at least one other interactively indistinct object.

2. The data processor controlled display system of claim 1 wherein said means for navigating to said second viewpoint moves said viewpoint without any interactive object involvement.

3. The data processor controlled display system of claim 1 wherein said second viewpoint is at greater virtual distance than said first viewpoint is from said one object.

4. The data processor controlled display system of claim 3 further including:

means for navigating to a third viewpoint at a lesser virtual distance than said second viewpoint from said one object, and means responsive to said navigation to the third viewpoint for rendering said one object interactively distinct and said aggregate object interactively indistinct.

5. The data processor controlled display system of claim 3 further including:

means for navigating to another viewpoint at which said aggregate object becomes interactively indistinct, and means for forming at said another viewpoint an interactively distinct higher level aggregate object comprising said interactively indistinct aggregate object and at least one other interactively indistinct object.

6. In a computer implemented method for displaying a virtual three-dimensional display workspace having virtual user interactive objects within said workspace:

navigating to a first viewpoint at which at least one of said objects is interactively distinct, navigating to a second viewpoint at which said at least one object becomes interactively indistinct, and forming at said second viewpoint an interactively distinct aggregate object comprising said interactively indistinct object and at least one other interactively indistinct object.

7. The method of claim 6 said navigation to said second viewpoint is without any interactive object involvement.

8. The method of claim 6 wherein said second viewpoint is at greater virtual distance than said first viewpoint is from said one object.

9. The method of claim 8 further including the steps of:

navigating to a third viewpoint at a lesser virtual distance than said second viewpoint from said one object, and responsive to said navigation to the third viewpoint, rendering said one object interactively distinct and said aggregate object interactively indistinct.

10. The data processor controlled display system of claim 6 further including the steps of:

navigating to another viewpoint at which said aggregate object becomes interactively indistinct, and forming at said another viewpoint an interactively distinct higher level aggregate object comprising said interactively indistinct aggregate object and at least one other interactively indistinct object.

11. A computer program having data structures included on a computer readable medium which causes the display on a data processor supported display of a virtual three-dimensional display workspace having virtual user interactive objects within said workspace and comprising:

means for navigating to a first viewpoint at which at least one of said objects is interactively distinct, means for navigating to a second viewpoint at which said at least one object becomes interactively indistinct, and means for forming at said second viewpoint an interactively distinct aggregate object comprising said interactively indistinct object and at least one other interactively indistinct object.

12. The computer program of claim 11 wherein said means for navigating to said second viewpoint moves said viewpoint without any interactive object involvement.

13. The computer program of claim 11 wherein said second viewpoint is at greater virtual distance than said first viewpoint is from said one object.

14. The computer program of claim 13 further including:

means for navigating to a third viewpoint at a lesser virtual distance than said second viewpoint from said one object, and means responsive to said navigation to the third viewpoint for rendering said one object interactively distinct and said aggregate object interactively indistinct.

15. The computer program of claim 13 further including:

means for navigating to another viewpoint at which said aggregate object becomes interactively indistinct, and means for forming at said another viewpoint an interactively distinct higher level aggregate object comprising said interactively indistinct aggregate object and at least one other interactively indistinct object.

\* \* \* \* \*